Figures 4, 6:
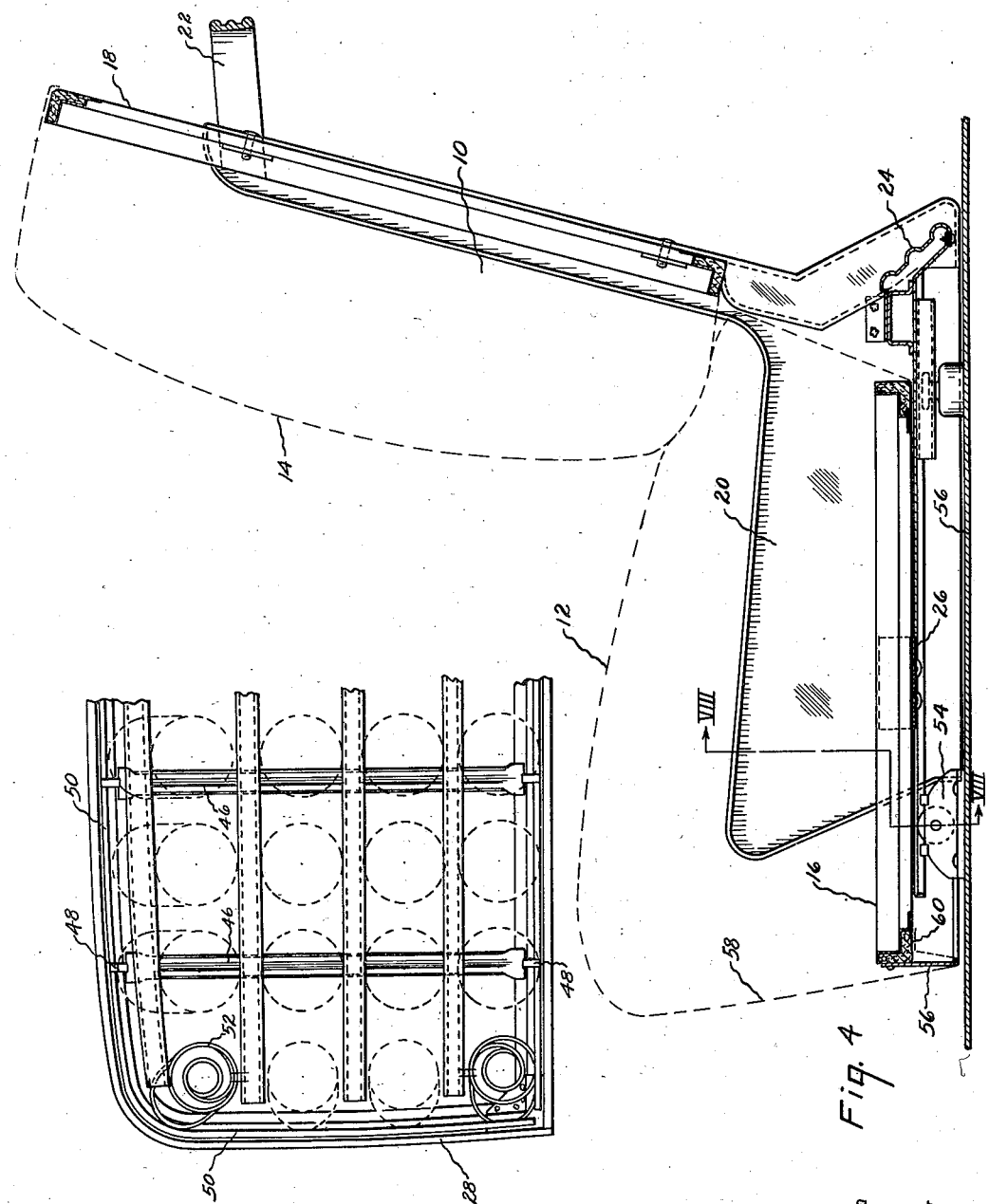

Nov. 24, 1936.  J. D. SHERMAN ET AL  2,061,923
SEAT FRAME FOR AUTOMOBILES AND THE LIKE
Filed May 9, 1936  3 Sheets-Sheet 1
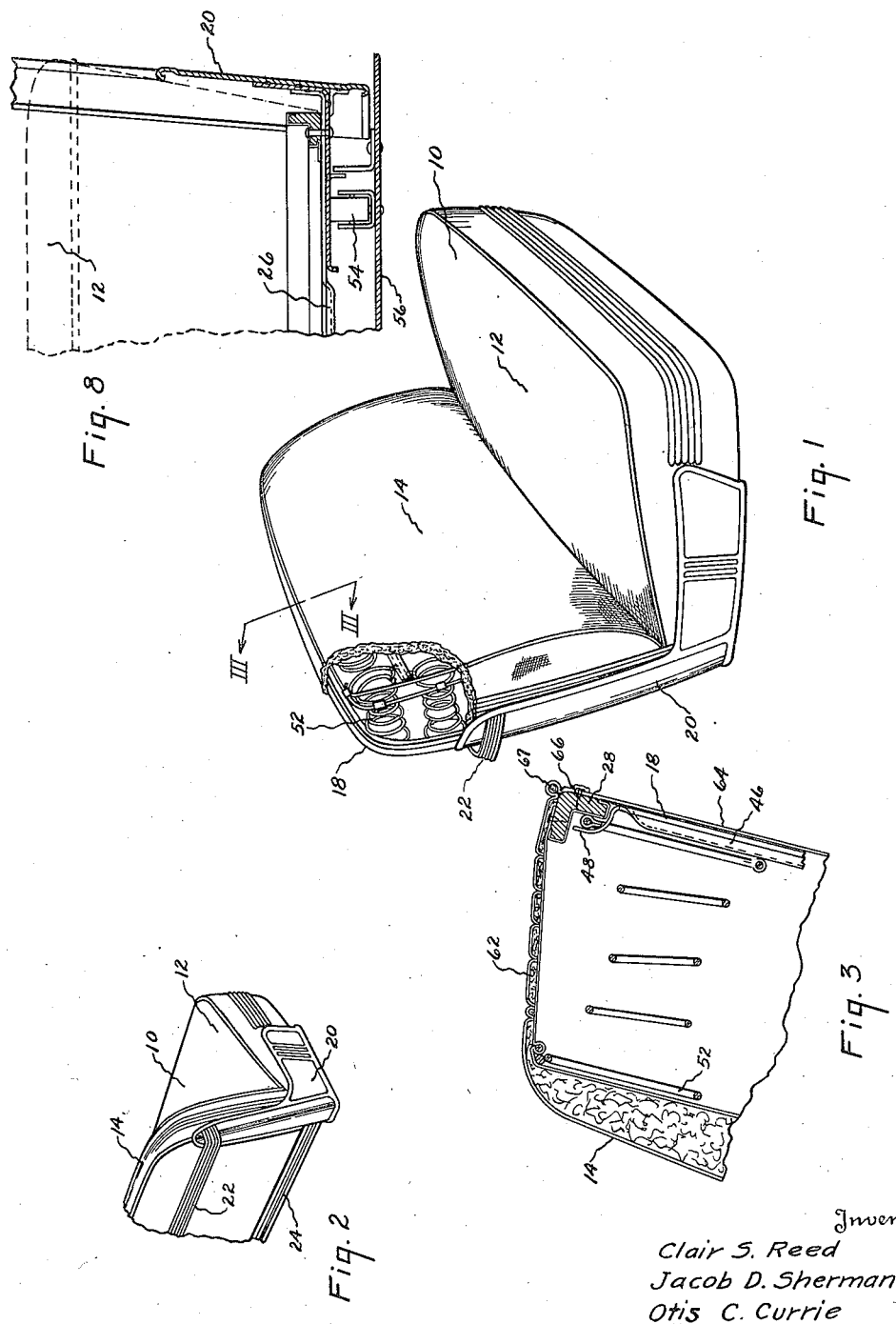
Inventors
Clair S. Reed
Jacob D. Sherman
Otis C. Currie
By Beaman & Langford
Attorneys Nov. 24, 1936. J. D. SHERMAN ET AL 2,061,923
SEAT FRAME FOR AUTOMOBILES AND THE LIKE
Filed May 9, 1936 3 Sheets-Sheet 2

Inventors
Clair S. Reed
Jacob D. Sherman
Otis C. Currie
By Beaman & Langford
Attorney Nov. 24, 1936.  J. D. SHERMAN ET AL  2,061,923
SEAT FRAME FOR AUTOMOBILES AND THE LIKE
Filed May 9, 1936  3 Sheets-Sheet 3
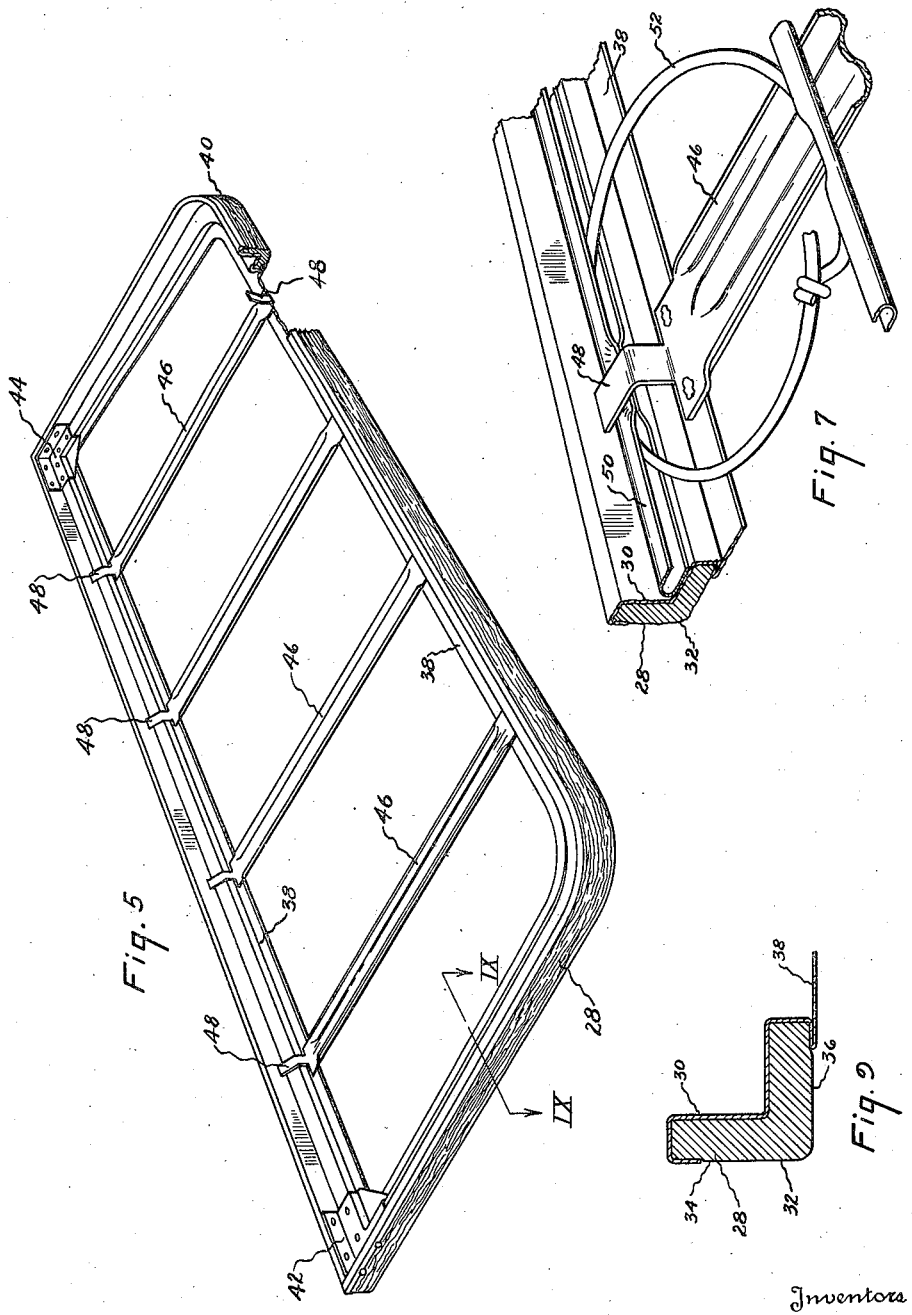
Inventors
Clair S. Reed
Jacob D. Sherman
Otis C. Currie
By Beaman & Langford
Attorney Patented Nov. 24, 1936

2,061,923

UNITED STATES PATENT OFFICE 2,061,923

SEAT FRAME FOR AUTOMOBILES AND THE LIKE

Jacob D. Sherman, Clair S. Reed and Otis C. Currie, Jackson, Mich., assignors to Reynolds Spring Company, Jackson, Mich., a corporation of Delaware Application May 9, 1936, Serial No. 78,840

6 Claims. (Cl. 155—180)

The present invention relates to seat frame construction being particularly designed for automobiles and the like.

Heretofore it has been the conventional practice in the automobile industry to construct adjustable front seat frames from wood, the wood being shaped to give the desired contour of the seat. In such prior constructions the wood has been relied upon for rigidity and strength of construction as well as affording a tacking surface to receive tacks or other fasteners used in upholstering the seat frame and cushion spring structures. Although the excessive cost of production and weight and bulk of such constructions has been recognized and improvements have been desired for a considerable period no substantial commercially acceptable improvements or advancements have been forthcoming.

In the manufacture of cushion spring structures to be assembled in the bottom of the seat frame it has long been the practice to use a composite rolled border frame of sheet metal and fibrous strip as shown in Patent No. 1,270,238 to Falls. When used in automobiles such constructions have been supported upon an auxiliary frame in the front seats or directly rested upon the floor structure when used in connection with the rear seats, the composite border frame being supported throughout its entire extent and functioning solely to align the springs and to provide a tacking surface for the upholstery. In the patent to Ledwinka, No. 1,543,858, a similar composite border frame has been proposed for the back structure of the cushion springs. Here again the border frame has been supported by an auxiliary frame or structure.

According to the present invention a seat frame is contemplated including as an important structural element a composite rolled border member of sheet metal and fibrous material of a design providing the necessary strength and rigidity as well as a tacking surface for the upholstery. Preferably the cushion springs are assembled within the light weight frame structure of wire, sheet metal or combination of both in any usual manner as might be comparable with the spring structure heretofore used in back constructions. These light frameworks with the cushion springs assembled therein are then supported in the frame defined by the aforesaid composite structural element.

Thus an object of the invention is to provide a lighter weight, less expensive seat frame than has been heretofore developed in which a composite structural element of sheet metal and fibrous material constitutes a major structural part of the seat frame as well as providing a tacking surface for the upholstery.

Another object is to provide a seat frame made up from two substantially similar frameworks disposed in rigid spaced relation, the frameworks being defined by composite sheet metal and fibrous members of design and of a cross section giving strength and rigidity and adequate tacking surface for upholstering the seat frame and cushion spring structures.

A further object is to provide a composite sheet metal and fibrous structural element from which seat frames may be constructed which is of L-section and has two angularly disposed sides constituting tacking surfaces for upholstering the seat frame, and cushion spring structure.

A still further object resides in novel cooperating seat frame and cushion spring structure.

These and other objects and advantages residing in the construction, arrangement and combination of parts will be more fully set forth hereinafter and will become apparent when the following detailed description is considered in connection with the accompanying drawings, wherein:

Fig. 1 is a perspective view of an adjustable front seat construction for automobiles and the like particularly shown in broken cross-section, Fig. 2 is a fragmentary perspective view of seat construction shown in Fig. 1 as viewed from a different angle, Fig. 3 is a fragmentary cross-sectional view taken on the line III—III of Fig. 1 showing the manner in which the back cushion and seat frame is upholstered, Fig. 4 is a cross-sectional view taken through a plane between the sides of the seat frame, the cushion spring structures being omitted for the sake of clarity, Fig. 5 is a perspective view of a framework structure which makes up the bottom and back of the seat frame, Fig. 6 is a fragmentary plan view of the framework structure shown in Fig. 5 constituting the back of the seat frame and showing the cushion structure in assembled position, Fig. 7 is an enlarged typical section showing the method of assembling the cushion spring structure to the framework of the seat frame fabricated from our improved composite structural element, Fig. 8 is a cross-sectional view of the seat frame showing the adjustment structure and means of support, and Fig. 9 is a cross-sectional view of our improved composite structural element taken on line IX—IX of Fig. 5.

As the present invention is particularly adapted to front seat construction of automobiles and the like of the type bodily adjustable relative to the dash, the principles of the same have been illustrated in connection witth such a construction. While the same principles of fabrication may be used in rear seats and other type of seat construction, the adjustable front seat being entirely without support from the side or rear frame of the automobile body particularly emphasizes the strength and rigidity of our proposed seat frame.

Referring to Figs. 1, 2 and 4 the adjustable front seat 10 comprises an upholstered cushion spring seat structure 12 and back spring structure 14 respectively supported in frameworks 16 and 18 of the seat frame. Sheet metal side members 20 rigidly tie together the frameworks 16 and 18 through the assistance of tierods 22 and 24 which take the form of a robe rail and foot rest, respectively, and a tierod 26 beneath the center portion of the framework 16. In Fig. 5 is shown what may be considered as typical of the construction of the frameworks 16 and 18. The border of the framework is defined by a composite sheet metal and fibrous element 28 which is preferably of L-section. By a rolling operation the metal strip 30 is shaped to the fibrous strip 32 which may be preformed or rolled from flat stock at the time the metal strip 30 is being formed. In practice the metal strip 30 is of twenty gauge stock or more which is somewhat heavier than has heretofore been used in composite border frames in cushion spring structures of the type used in the aforesaid patents. Stiff twist kraft paper which becomes exceedingly hard and rigid upon drying out is preferably used as the fibrous strip 32. As is more clearly shown in Fig. 9 the metal strip 30 conforms to the two inner surfaces of the strip 32 and embraces the edges thereof leaving the surfaces 34 and 36 of the strip 32 exposed for tacking purposes. One edge of the metal strip 30 is shown return bent upon itself to provide the flange 38. From inspection of Fig. 5 it will be seen that the element 28 is fabricated in lengths which may be shaped to form one or more sides of the framework. As illustrated, a single continuous length has been shaped at 39 and 40 to provide rounded corners defining three sides with the closing side in the form of a single straight section held in assembly by sheet metal corner brackets 42 and 44. To complete the framework sheet metal cross members 46 are provided which extend between opposed sides and are welded or otherwise suitably affixed to the flanges 38. As a convenient method of attaching the cushion spring structures to the frameworks, the members 46 are provided with tongues 48 at each end which are deflected away from the inside of the element 28 but which are bent down to clamp the U-bar border frames 50 of the cushion spring structures which are assembled as a unit in any suitable well known manner and imposed upon the frameworks 16 and 18 preferably after the latter has been assembled into the seat frame construction. The cross members 46 are channel shaped for strength and rigidity and to support the coil springs 52 in the plane of the surface of the element 28 upon which the U-bar border frame 50 is clamped by the tongues 48 as clearly shown in Fig. 3.

The construction of the structural element 28 which provides the required strength, rigidity and tacking surface for the upholstery of our improved seat frame is one of the essential features of the present invention and for that reason is herein specifically treated. It is light and relatively inexpensive to fabricate, being capable of high production upon the usual rolling equipment. As illustrated in Fig. 5, the structural element 28 may be shaped about any desired radius encountered in seat frame construction. As shown in Fig. 4, the forward portion of the framework 16 of the seat 10 has an unsupported overhang with reference to the antifriction support 54 attached to the floor structure 56 upon which the seat frame is adjusted relative to the dash in a well known manner. It is the vertical portion of the L-section of the element 28 which offers rigid support to the load carried upon the overhanging portion of the seat cushion 12. Similarly, it is the horizontal position of the L-section of the element 28 which offers rigid support to the load carried upon the back cushion 14 between the sides of the seat frame. In practice the depth of the normally disposed portions of the structural element 28 is in excess of an inch and in order to provide adequate resistance against bending moment in the plane of such portions and to provide adequate exposed tacking surface; the section of the element 28 shown in Fig. 9 being shown approximately full size scale.

The design of the structural element 28 as heretofore stated is such as to provide exposed tacking surfaces 34 and 36 in normally disposed planes. As shown in Fig. 4, a depending relatively rigid skirt 56 is affixed to the vertical tacking surface of the framework 16 about which the upholstering 58 shown in dotted outline is drawn prior to being tacked to the horizontal tacking surface of the element 28 as at 60 so as to give the effect of a deep cushion seat. In Fig. 3 the upholstering 62 for the back cushion 14 is shown tacked to the substantially horizontally exposed surface of the element 28 while the usual fabric covered cardboard back 64 for the seat frame is tacked to the vertically disposed tacking surface as at 66. The usual finishing bead or strip is shown at 67 to conceal the adjacent edges of the upholstering for the front and back of the seat frame and cushion spring structures. As more clearly illustrated in Fig. 9, the exposed surfaces 34 and 36 of the fibrous strip 32 merge to provide an unobstructed tacking surface of approximately two inches in width extending longitudinally of the structural element 28 throughout its entire length. This provides adequate tacking surface without any lost time in production in locating the exposed surfaces when covered by the upholstering at the time the tacking operation is performed.

For the purpose of simplifying the description, the framework disclosed in Fig. 5 has been described as typical of the frameworks 16 and 18 constituting the bottom and back sections of the seat frame 10. It is to be understood, however, that the shape and construction of the frameworks 16 and 18 need not and may not always be the same. Moreover, we anticipate that the structural element 28 may be employed in other types of seat construction. In order to fully understand and appreciate the present invention the framework 16 constituting the bottom section of the seat frame 10 may be considered as taking the place and eliminating the necessity of the composite border frame of the cushion spring structure shown in the above mentioned Falls patent and as being a self-supporting framework as distinguished from one requiring an additional or auxiliary framework for its support and rigidity. When compared with the present method of front seat frame construction fabricated from wood our proposed seat construction results in a saving of weight of approximately twenty pounds and a reduction in cost of fabrication of approximately twenty-five per cent.

The cushion spring structures to be imposed upon the frameworks 16 and 18 may include any of the known forms of coil and other types of springs and may be aligned and held in assembled relation in any of the usual known forms of construction. As the frameworks 16 and 18 provide the required rigidity and supply the tacking surfaces for the upholstery it is apparent that any frame structure heretofore used in connection with the manufacture of cushion spring structures possessing these characteristics can be omitted when such structures are to be used in connection with our proposed seat frame.

Having thus described our invention what we desire to protect by Letters Patent and claim is:

1. A seat frame for automobiles and the like having as a relatively rigid structural part thereof a composite border frame member formed of an elongated fibrous strip in cross-section having vertical and horizontal portions and an elongated reinforcing sheet metal strip, said fibrous strip being located upon the outer side of said member to provide an exposed surface on the outer side of said frame to receive tacks for the upholstering of the frame, said metal strip overlying the inner side of said vertical and horizontal portions of said fibrous strip and being secured thereto, said metal strip in cross-section presenting a vertical flange portion and a horizontal flange portion paralleling said vertical and horizontal portions of said fibrous strip and providing stiffening webs in planes parallel to the normal load received by the frame in use, the width of said flange portions being substantially greater than the combined thickness of said flanged portions and the portions of said fibrous strip directly associated therewith.

2. A seat frame for automobiles and the like having as a structural part thereof a composite border frame member of sheet metal and fibrous strip rolled one upon the other, said fibrous strip being substantially L-shaped in cross-section with the inner sides and ends of the normally disposed sections of said fibrous strip covered by said metal strip, and adjoining longitudinally extending portions of the outer sides of said sections of said fibrous strip being fully exposed to provide tacking surfaces for the upholstering.

3. A seat frame for automobiles and the like having as a structural part thereof a composite border frame member of sheet metal and fibrous strips rolled one upon the other, said fibrous strip being substantially L-shaped in cross-section with said sheet metal strip conforming to the inside of said fibrous strip and embracing the ends of the normally disposed sections thereof with the longitudinal edges of said metal strip overlying only a relatively small area of the outer sides of said normally disposed sections of said fibrous strip whereby the major portion of the outer sides of said sections of said fibrous strips are fully exposed longitudinally of said member to provide tacking surfaces for the upholstering.

4. A framework for the bottom or back of a seat structure for automobiles and the like having borders defined by a composite structural element, said element including an elongated fibrous strip substantially L-shaped in cross-section having the inner sides reinforced by an elongated metal strip substantially L-shaped in cross-section, said metal strip lying within the angle of said fibrous strip and secured thereto, at least the major portion of the outer sides of said fibrous strip being exposed and available for tack receiving purposes, said structural element having one of its flange portions lying at right angles to its other flange portion and disposed in the plane of the normal load supported by said framework.

5. The framework cited in claim 4 in which a seat bottom and a seat back are disposed adjacent each other in ordinary usable relation and in which the outer sides of the respective fibrous strips constitute the rear, side, and top edges of said seat back and the front, side, and under edges of said bottom.

6. A front seat for automobiles and the like comprising bottom and back frameworks each of said frameworks being entirely fabricated from a composite structural element made up of an elongated sheet metal strip and elongated strip of hard twisted kraft paper stock rolled one upon the other, and sheet metal cross members, said element being used as a border frame for said frameworks and being shaped to the desired contour of said seat, said strip of paper stock being substantially L-shaped in cross-section with said metal strip lying within the angle of said paper strip and conforming to the inner sides and embracing the longitudinally extending edges of the normally disposed portions of said strip of paper stock, the major part of the outer sides of said portions of said paper stock being fully exposed longitudinally of said element to provide tacking surfaces along the top, side and back edges of said back framework and along the front, side and bottom edges of said bottom framework, said sheet metal strip having return bent portions defining an inwardly turned flange extending longitudinally of said element embracing one edge of said strip of paper stock, said cross members extending transversely of said frameworks and being affixed to said flange at their opposite ends, the portions of said metal strip imposed upon the inner side of said strips of fibrous stock defining a supporting ledge for the cushion spring unit, said cross members having tongues overlying said ledge and adapted to be deflected to secure said cushion frame structures thereon, said frameworks constituting the main supporting structure for said cushion spring units and the exposed tacking surfaces thereof serving jointly for the upholstering of both the seat frame and the cushion spring units.

J. D. SHERMAN.
CLAIR S. REED.
OTIS C. CURRIE.